A. B. DICK.
STYLUS.
APPLICATION FILED APR. 29, 1914.

1,145,571. Patented July 6, 1915.

WITNESSES
J. McIntosh
M. S. Gang

INVENTOR
Albert B. Dick
BY
J. T. Edmonds
ATTORNEY

UNITED STATES PATENT OFFICE.

ALBERT B. DICK, OF LAKE FOREST, ILLINOIS, ASSIGNOR TO A. B. DICK COMPANY, OF CHICAGO, ILLINOIS, A CORPORATION OF ILLINOIS.

STYLUS.

1,145,571.

Specification of Letters Patent.

Patented July 6, 1915.

Application filed April 29, 1914. Serial No. 835,072.

*To all whom it may concern:*

Be it known that I, ALBERT B. DICK, a citizen of the United States, residing at Lake Forest, in the county of Lake and State of Illinois, have invented certain new and useful Improvements in Styli, of which the following is a specification.

This invention relates particularly to a stylus suitable for use in the process of duplicating which involves the employment of coated or impregnated sheets.

Heretofore, and especially in the process of duplicating autographic matter by means of a thin, closely woven sheet coated with relatively hard wax, it has been common to employ a stylus having a fairly sharp point, the body of the stylus tapering uniformly toward such point, and for use in conjunction with the particular material described a stylus of such form is more or less adapted. For other stencil-sheets, for example those employing porous or loosely woven fabric, such as yoshino, the sharp-pointed stylus is objectionable, for the reason that it "picks up" the fibers of the paper and, wherever this is done, a large opening is made in the stencil-sheet, through which in the duplicating operation ink is passed to the underlying impression-sheet. If, in order to prevent this, the point of the stylus is made extremely blunt, it is possible to avoid picking up fibers, but, on the other hand, the lines traced by the stylus are made objectionably broad.

Under my invention, I produce a stylus capable of effective use in connection with stencil-sheets of the character last referred to and by means of which lines can be drawn or ruled without danger of picking up the fibers, and also without unduly broadening the openings formed in the stencil and through which the ink is subsequently to be passed.

The invention is illustrated in the accompanying drawing, in which—

Figure 1:
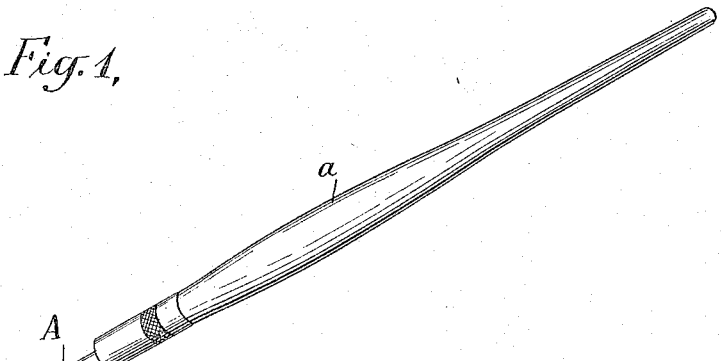
Figure 2:
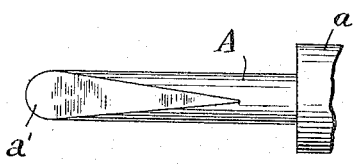
Figure 3:
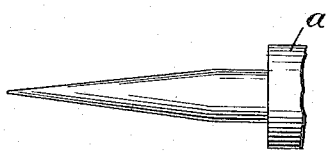
Figure 4:
Figure 5:
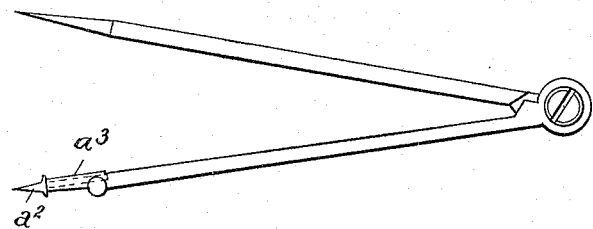

Figure 1 is a perspective view of the stylus embodying my invention; Figs. 2 and 3 are detail views on enlarged scale, illustrating the stylus-point in two positions, one at right angles to the other; Figs. 4 and 5 illustrate the stylus-point in a form in which it may be desirably embodied for use in connection with a pair of compasses.

The stylus proper, A, is provided with the usual handle $a$, and is preferably made of hard steel. Instead of tapering uniformly to a point, as in the case of the styli heretofore employed, it is of substantially uniform thickness in one direction but in the direction at right angles thereto it is flattened on both sides, at $a'$, the stylus on these sides tapering to a point. This point, however, is, as best illustrated in Fig. 2, of substantial dimensions in one direction, and moreover is continuously rounding, there being no sharp projections. As a result, when the stylus is in use, as, for example, for the ruling of lines upon a stencil-sheet, all danger that the underlying fibers of the stencil-sheet shall be picked up, and so the opening through such stencil-sheet objectionably distorted, is avoided.

It is, of course, not essential that the taper of the flattened sides of the stylus be continuous, as illustrated in Fig. 2, although this construction is desirable. The taper may be continuous up to a certain point away from the extreme end of the stylus and then may take another direction, if preferred. The essential of the construction is that the stylus-point shall be of substantial width but thin, that the point shall be rounding, and that there shall be no sharp projections out of the rounding contour, to injuriously affect the stencil.

Instead of securing the stylus in the usual handle, the shank $a^2$ thereof may be inserted in the socket $a^3$ carried by one leg of a pair of compasses. The coaction of the stylus-point with the stencil-sheet will be the same as in the case above described.

Having now described my invention, what I claim as new therein and desire to secure by Letters Patent is as follows:

A stylus for use upon stencil-sheets formed of loosely woven fabric and stencil material carried thereby, said stylus having oppositely disposed, flattened and tapering surfaces meeting in a thin operating edge of substantial width, said edge having a continuously rounded contour, substantially as set forth.

This specification signed and witnessed this 27th day of April, 1914.

ALBERT B. DICK.

Witnesses:
W. A. WATERBURY,
W. G. ARNOLD.